H. J. SCOTT.
MEANS FOR CONTROLLING HEADLIGHTS.
APPLICATION FILED OCT. 30, 1911.

1,087,188.

Patented Feb. 17, 1914.

3 SHEETS—SHEET 1.

ATTEST
E. M. Fisher
F. C. Mussun.

INVENTOR
Homer J. Scott
BY Fisher & Moser ATTYS.

H. J. SCOTT.
MEANS FOR CONTROLLING HEADLIGHTS.
APPLICATION FILED OCT. 30, 1911.

1,087,188.

Patented Feb. 17, 1914.
3 SHEETS—SHEET 2.

ATTEST
E. M. Fisher
F. C. Museum

INVENTOR
Hosmer J. Scott
BY Fisher Mucosy ATTYS.

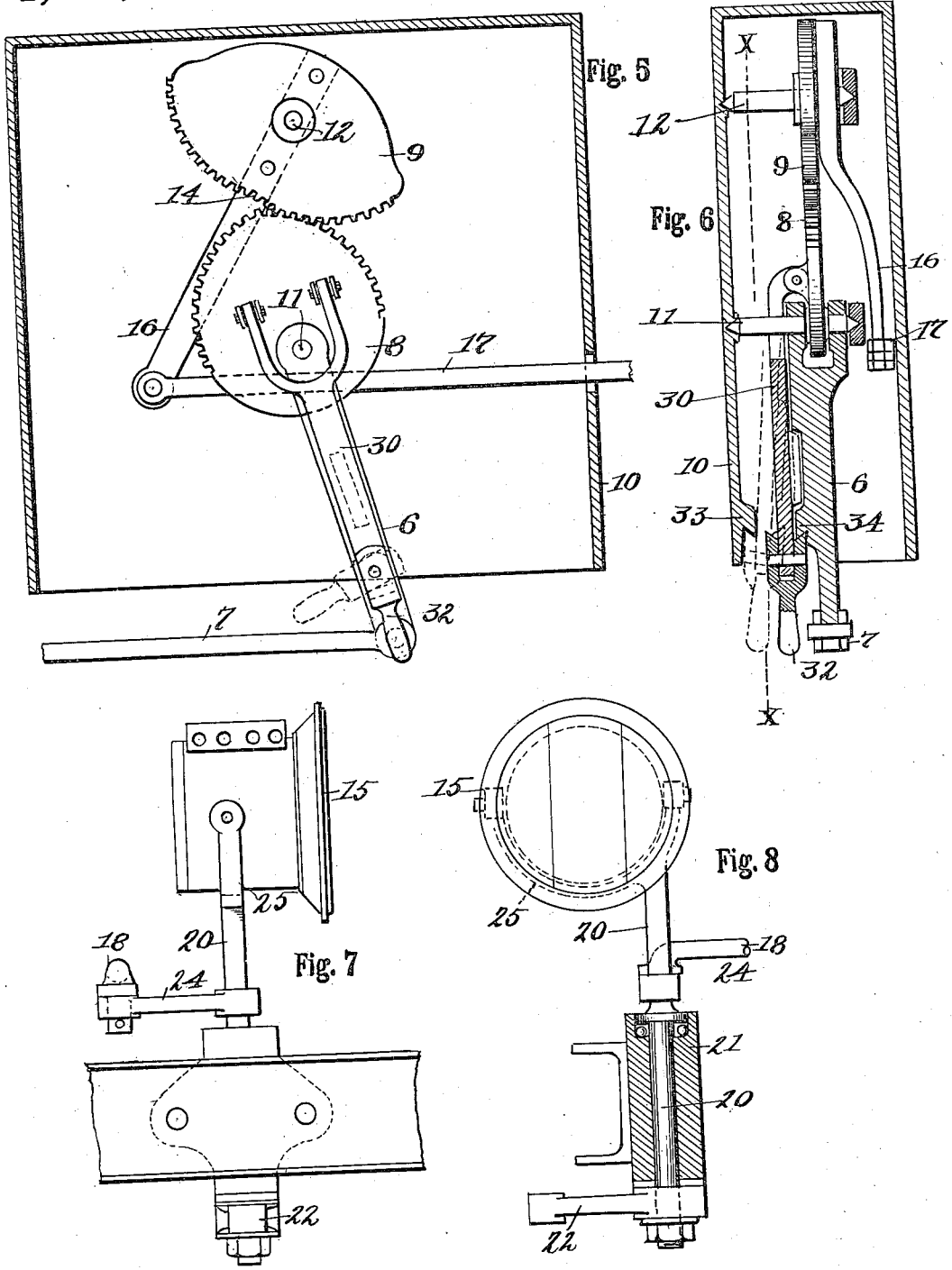

UNITED STATES PATENT OFFICE.

HOSMER J. SCOTT, OF CLEVELAND, OHIO, ASSIGNOR OF ONE-HALF TO S. N. SCHWARTZ, OF CLEVELAND, OHIO.

MEANS FOR CONTROLLING HEADLIGHTS.

1,087,188.  Specification of Letters Patent.  Patented Feb. 17, 1914.

Application filed October 30, 1911. Serial No. 657,508.

*To all whom it may concern:*

Be it known that I, HOSMER J. SCOTT, citizen of the United States, residing at Cleveland, in the county of Cuyahoga and State of Ohio, have invented certain new and useful Improvements in Means for Controlling Headlights, of which the following is a specification.

This invention has reference to improvements in controlling mechanism for headlights on motor cars, vehicles and auto machines of different kinds, and the invention consists in a mechanism having operating connection with a steering wheel, in this instance, and which is adapted to control the throw of the light in the direction of the vehicle on a turn in the road substantially as shown and described and particularly pointed out in the claims.

Figure 1:
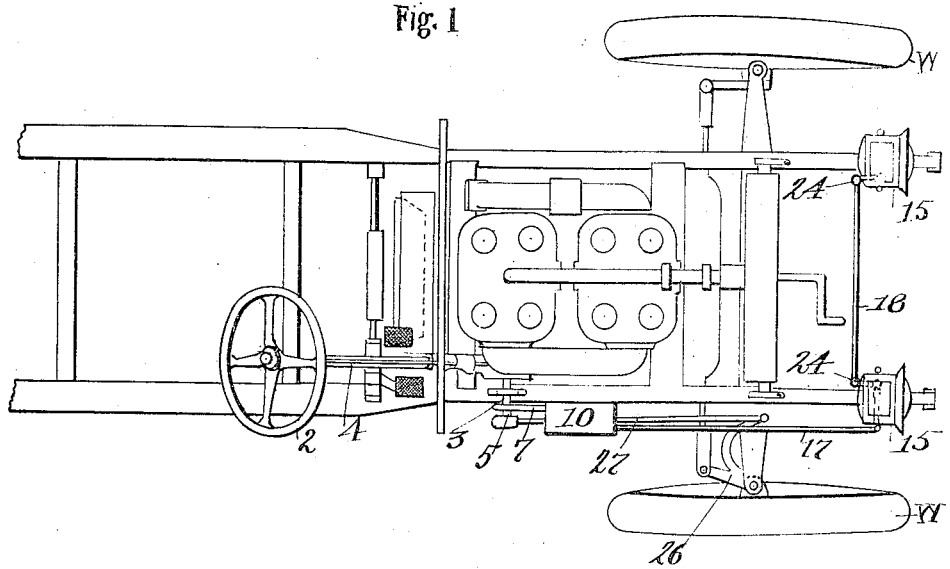
Figure 2:
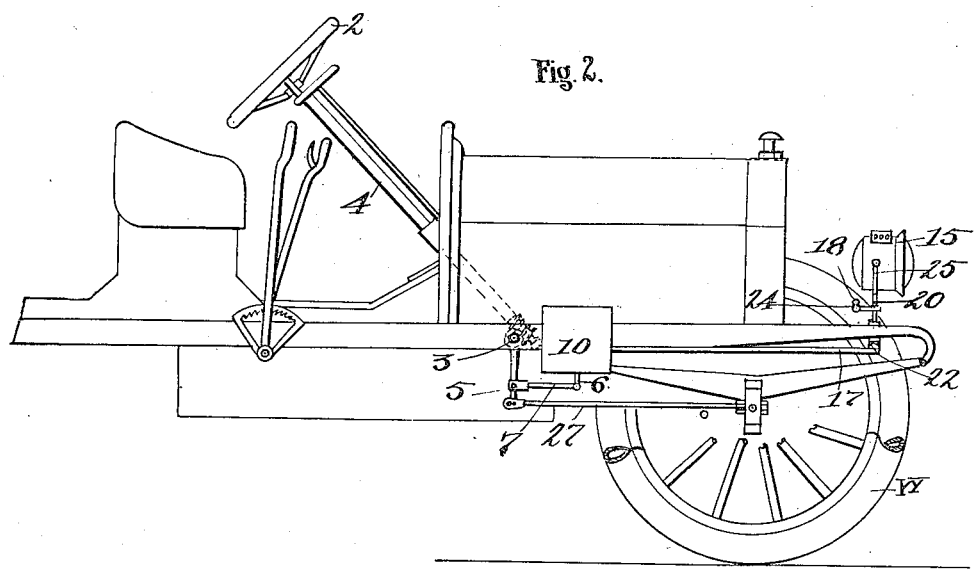
Figure 3:
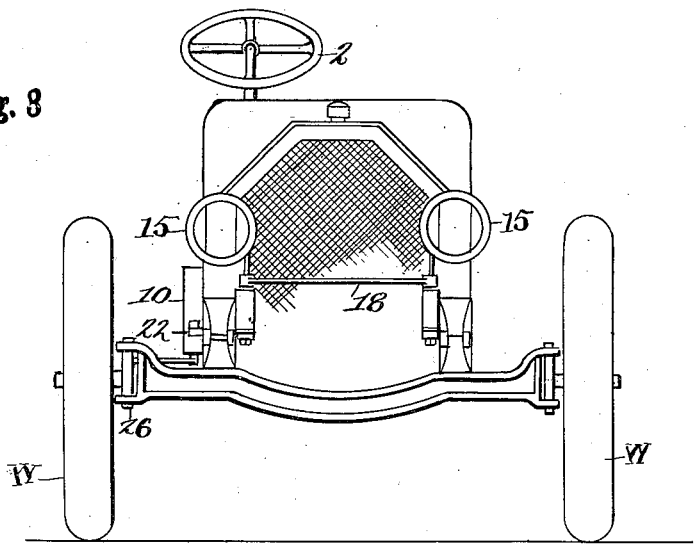
Figure 4:
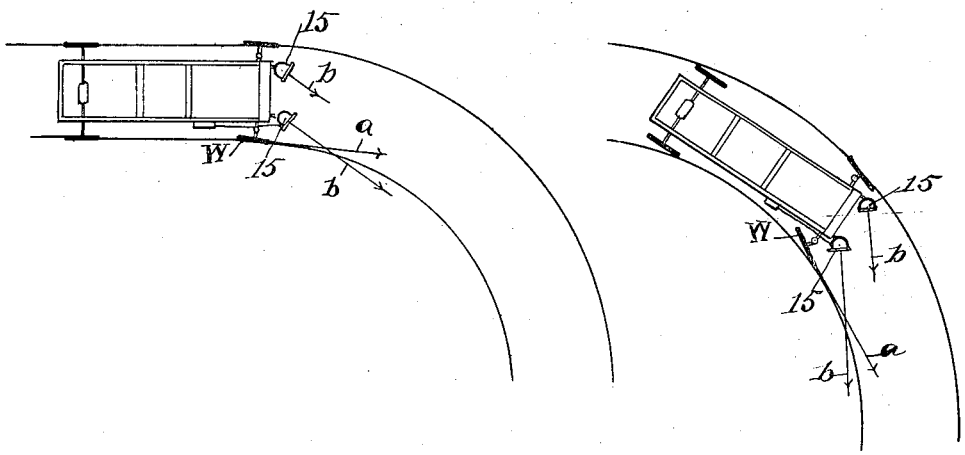

In the accompanying drawings, Figure 1 is a plan view of the front portion of an auto machine containing my invention, and Fig. 2 is a side view thereof. Fig. 3 is a front elevation of Fig. 1, and Fig. 4 is a diagrammatic view showing the machine on two different portions of a curve in the road, and the lamps at correspondingly different angles as to the vehicle and the curves as hereinafter fully set forth. Figs. 5 to 8 are enlarged views of the mechanism more immediately associated with the lights to control the same, and Fig. 5 is a cross section of the box containing a portion of said mechanism and otherwise on line *x—x*, Fig. 6. Fig. 6 is a cross section of Fig. 5 on the line of the pivots therein. Fig. 7 shows a light or lamp and its immediate support, and Fig. 8 is a front elevation of Fig. 7.

The invention as thus shown and described is illustrated in connection with a motor machine having steering wheels or levers but is not necessarily limited to such machine or connections, and the basic idea is to throw the light ahead on a curve or turn in the road so as to be able to get a clear view of the conditions far enough in advance of the machine to avoid accidents and promote safety in travel to both the machine and the public. Of course I am aware that it is not new at this time to provide cars and autos with devices which will automatically turn the lights or headlight in the direction of a turn in the road and restore them again to their normal position when the direct line of travel is resumed, but my conception goes beyond this and plans to anticipate the curve with the light and throw the curve into view when the machine has just started to make the turn. This is of the utmost possible importance, especially upon city streets, where a machine turns from one street into another right or left and there are pedestrians on the crossing or vehicles approaching from the opposite direction. The direction of the light upon such crossing or side street from a car about to enter therein will be a timely warning to persons or teams and also disclose their presence to the driver of the car, and which is most material for all the purposes of safety. Now, my invention provides for this contingency especially, and does so by emphasizing the rotation of the lights in the direction of the curve the instant the machine is turned initially in that direction, as illustrated at the left in Fig. 4. Then as the curve in the road is fully entered upon the turn of the lights is either approximately maintained or more or less increased so as to keep the light well in advance of the car and not merely upon the portion of the curve directly before the car as formerly. When the car approaches toward the direct line of travel again the light is carried back to or toward its original position very much after the manner of its forward movements above described.

The foregoing operations are mechanically associated with the usual steering mechanism in which a hand wheel or lever 2 is employed and a train of mechanism extends therefrom to the front wheels comprising, as in this instance, a horizontally disposed shaft 3 operatively connected with the steering wheel shaft 4 and provided with a short lateral arm 5 between its ends. This arm is connected with a lever 6, (Fig. 5) by a rod 7 and the said lever controls one of the two central and controlling elements in this system for governing the lights and which I regard as at the very heart of the invention. These elements or parts are the two gear members 8 and 9, Fig. 5, located in a box 10 at the side of the auto body but which might be located at some other point and in a more direct or immediate relation to the light or lights and still be within the invention. However, as shown, the said two parts represent eccentrically constructed and pivoted spur gears having pivots 11 and 12 respectively and constructed to have limited rocking movement or rotation with varying speed or throw imparted to the light or lamp actuating gear 9 according to the position of the vehicle on the curve. The said parts are therefore originally designed for this purpose, it being understood that they act alike whether the vehicle turn to the right or to the left, and also that the initial movement of gear 9 shall be such as to sweep the light on an arc from the direct line of travel onto the advanced portions of the curve the machine is to take when the machine itself has but started on the curve, thus lighting up the horizon in the new direction and warning pedestrians and others of the purpose and approach of the machine. Obviously, to effect these results, a peculiar construction of gears is required, and it will be observed that the initial or actuating gear 8 is of substantially oval shape with its more or less pointed or narrowed end meshing with the gear 9. This latter gear may be described as of a compound character adapted on both sides of its middle to like turns right or left and having a visible depression at its center indicated by 14. This depression is the nearest point to its pivot 12 and is the normal or direct riding point in said gear. The reduced portion of gear 8 also is engaged at this point and which is the farthest from its pivot 11.

Now, since an instantaneous sweeping turn of the light is desired with the start of the machine to turn this effect is obtained by reason of the longer axis of the gear 8 and the shorter axis of the gear 9 being in conjunction at this point and from which the eccentricity or reach of the gear 9 increases alike both right and left while in the gear 8 the distance from its pivot decreases in like ratio, thus keeping the parts in mesh at all times. The exact effect of this construction of the gears is not to conform the rotation of the lights to the turn of the vehicle as formerly but to obtain a searching and precautionary turn of the lights greatly magnified as compared with the turn of the vehicle as an initial movement particularly and for the purposes above set forth, after which the gears hold the light ahead more or less in the same proportion while the movement of the lights to the direct travel is the reverse of the foregoing.

Connection between the lights or lamps 15 and the gear 9 are by a lever 16 fixed on said gear and connections comprising rod 17 with one of said lights and through the rod 18 with both lights. Of course the lights are on pivots and adapted to turn and any equivalent connecting means may be interposed between said lights and said gear 9, the single idea being to promptly impart the movements of the gear to the lights. If a single light were employed the connections would be modified accordingly. However, I do show certain details which work advantageously and comprise rotatable standards 20 for the lights supported in vertical ball bearings 21 and provided with arm 22 engaged by rod 17 while cross rod 18 between the lamps engages arms 24, and the lamp or light is supported in a yoke 25 on the said standard 20, and in this instance the standard has the yoke at one side rather than at the center, and of course my invention contemplates a light adapted to be turned or rotated horizontally.

The operation of the invention is best illustrated in Fig. 4, wherein the machine itself really has not as yet turned at all as indicated in the first diagram but a slight turn to the right has been given to the steering wheels. This is instantly accomplished by an angle of rotation in the lamps 15 which throws the light athwart the curve which the machine has started to take with a searching sweep from the direct position to a decided angle and far in advance of the approaching attitude of the machine on the curve, as further illustrated in the second diagram. The exact and very material difference is shown in the respective arrows $a$ and $b$, the arrows $a$ indicating the angle of curvature assumed by the steering wheels and the arrows $b$ the considerably greater curvature to which the lights have been moved and to the manifest advantage of all concerned whether in the car or on the road It will be understood from the foregoing description that the invention may be used on power driven cars on tracks as well as on vehicles or machines driven in the streets, and any suitable controlling connection can be made in lieu of the steering wheel connections shown herein.

In Figs. 5 and 6 I show a lever 30, which is hinged on gear 8 and adapted to swing laterally into locking engagement with the side of the box 10 when the light or lamp is not to be operated, as in the day time, but otherwise is fixed to the lever 6 and operated therewith. A bifurcated lever lock 32 is pivoted on the end of lever 30 and adapted at one side to engage rigidly with the lever 6, and at the other side to engage in like manner with the box 10, or to be definite, with the undercut lug 33 thereon. A similar lug 34 is formed on lever 6, and the lock 32 is adapted to swing on its pivot into or out of locking engagement. In fact it is the sole medium by which the lever 6 is operatively connected with the gear 8. When engaged with box 10 the lever 6 may be operated but it will not move the gear 8.

The terms cars, machines and vehicles are interchangeably used herein to include all power driven embodiments whether used on tracks or without but in the present case the invention is shown in an automobile.

The shafts 3 and 4 and arm 5 represent the connections usually provided to operate the front wheels W through steering knuckle 26 and connecting rod 27. This peculiarity of operation of gears 8 and 9 should be noted, that although the first movement imparted thereto by the steering wheel accents turning of the lamp in respect to the wheels, every succeeding movement gradually lessens the difference in turning movements between the two. Other differential gearing may be used to obtain the results sought, and although shown in a box upon the side of the vehicle, it is obvious that it might be at the front or at the lamps and therefore I do not wish to limit myself to the exact location and arrangement of the parts as shown.

What I claim is:

1. In power driven cars, a lamp adapted to be horizontally rotated and means operatively connected with the steering mechanism of the car adapted to turn the lamp to either side at a greater angle than the steering wheels on the car assume in making a turn in the road, said mechanism consisting in a pair of eccentric gears having their greatest eccentricity at the point of initial rotation.

2. A wheeled vehicle and a horizontally rotatable lamp thereon, in combination with means to turn said lamp on its axis comprising an oval shaped actuating gear and an eccentrically mounted gear having an increasing depth from its middle portion to both sides engaged by said oval shaped gear.

3. In road machines, a rotatably mounted lamp at the front of the machine and devices to rotate the same comprising an actuating gear of substantially oval shape pivoted eccentrically and having teeth about its smaller end, and a gear actuated thereby having a toothed edge with a depression in its middle adapted to be engaged by the smaller end of the said actuating gear, and hand controlled means operatively connected with said actuating gear.

4. A road machine having steering wheels and mechanism and a lamp thereon, and means to control the lamp comprising two eccentrically mounted gears operatively engaged with each other, one of said gears having a depression at its middle and increasing eccentricity from said depression outward on both sides and the other gear having its deepest portion adapted to engage in said depression, and means to operate said gears connected with the said steering mechanism.

5. A road machine and a rotatable lamp therein, in combination with steering mechanism and means to rotate said lamp operatively connected with said mechanism, said means comprising two eccentrically pivoted gears meshing at their edges, one of said gears adapted to rotate from its highest to its lowest point of eccentricity and the other from its lowest to its highest point of eccentricity, and connections between the said latter gear and the said lamp, whereby the maximum throw is given to the lamp at the initial movements of said gears.

6. A device adapted to operate lamps in road machines comprising two intermeshing actuating and actuated gears respectively, a controlling lever pivoted on the axis of said actuating gear and a locking lever pivoted on the same gear and adapted to be interlocked with said controlling gear, whereby the said gear mechanism can be operatively connected with said controlling lever.

7. A device of the kind described having an actuating gear, a controlling lever therefor independently pivoted on the pivot of said gear and a device adapted to operatively lock said actuating gear with said controlling lever.

In testimony whereof I affix my signature in presence of two witnesses.

HOSMER J. SCOTT.

Witnesses:
F. C. MUSSUN,
E. M. FISHER.